US012689282B2

(12) United States Patent
Kazama et al.

(10) Patent No.: US 12,689,282 B2
(45) Date of Patent: Jul. 21, 2026

(54) VOLTAGE CLAMP CIRCUIT FOR A GATE DRIVER CIRCUIT

(71) Applicant: Texas Instruments Incorporated, Dallas, TX (US)

(72) Inventors: Taisuke Kazama, Plano, TX (US); Mustapha El-Markhi, Richardson, TX (US); Avadhut Junnarkar, McKinney, TX (US); Indumini W Ranmuthu, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 223 days.

(21) Appl. No.: 18/361,033

(22) Filed: Jul. 28, 2023

(65) Prior Publication Data

US 2025/0038645 A1      Jan. 30, 2025

(51) Int. Cl.
$H02M\ 3/158$          (2006.01)
$H02M\ 1/00$          (2006.01)

(52) U.S. Cl.
CPC ....... H02M 1/0006 (2021.05); H02M 3/1584 (2013.01)

(58) Field of Classification Search
CPC ...... H02M 1/0006; H02M 1/08; H02M 1/088; H02M 3/158; H02M 3/1584
See application file for complete search history.

(56) References Cited

U.S. PATENT DOCUMENTS

| | | | |
|---|---|---|---|
| 6,356,465 B2 | 3/2002 | Yasumura | |
| 8,587,362 B2 | 11/2013 | Machida et al. | |
| 9,755,423 B2 | 9/2017 | Sandner et al. | |
| 9,813,009 B1 | 11/2017 | Xu et al. | |
| 10,547,304 B2 | 1/2020 | Yamaji | |
| 10,734,806 B2 | 8/2020 | Zhao et al. | |
| 11,569,658 B2 | 1/2023 | Parthasarathy et al. | |
| 11,652,478 B2 | 5/2023 | Curbow et al. | |
| 2003/0214769 A1 | 11/2003 | Nishikawa et al. | |
| 2009/0015224 A1* | 1/2009 | Hirao | H02M 3/158 |
| | | | 323/282 |
| 2009/0257254 A1 | 10/2009 | Leu | |
| 2020/0381989 A1* | 12/2020 | Kuang | H03K 19/01714 |
| 2021/0050779 A1* | 2/2021 | Deng | H02M 3/073 |
| 2022/0329170 A1 | 10/2022 | van Zyl | |

* cited by examiner

*Primary Examiner* — Alex Torres-Rivera
(74) *Attorney, Agent, or Firm* — Frank D. Cimino

(57) ABSTRACT

Described embodiments include a gate drive circuit with a first transistor coupled between an input voltage terminal and a switching terminal, and having a first control terminal. A second transistor is coupled between the switching terminal and ground, and has a second control terminal. A first driver circuit has a first driver output coupled to the first control terminal, a first positive supply input coupled to a bootstrap voltage terminal, and a first negative supply input coupled to the switching terminal. A second driver circuit has a second driver output coupled to the second control terminal, a second positive supply input coupled to a driver supply, and a first negative supply input coupled to ground. An active clamp circuit is coupled between the driver supply and ground, and prevents a voltage between the driver supply and ground from exceeding a threshold voltage.

23 Claims, 5 Drawing Sheets

300

400

VOLTAGE CLAMP CIRCUIT FOR A GATE DRIVER CIRCUIT

BACKGROUND

This description relates to active voltage clamp circuits, such as the voltage clamp circuits that may be used in gate drivers, especially gate drivers in DC-DC power converters. Active voltage clamp circuits can be useful for controlling the supply voltage for gate drivers in multiphase DC-DC power converters, which may have a high current-handling capability requirement in some cases.

Higher power requirements make power efficiency an important consideration in the design of multiphase DC-DC power converters. To improve power efficiency, driver stages may be designed with faster turn-on and turn-off times to reduce switching losses. However, faster switching times can result in ringing due to parasitic inductances on the voltage supply and ground lines. Ringing on the voltage supply and ground lines can lead to overvoltage conditions, creating reliability concerns.

SUMMARY

In a first example, a gate drive circuit includes a first transistor coupled between an input voltage terminal and a switching terminal, and having a first control terminal. A second transistor is coupled between the switching terminal and a ground terminal, and has a second control terminal. A first driver circuit has a first driver input, a first driver output, a first positive supply input and a first negative supply input. The first driver output is coupled to the first control terminal. The first positive supply input is coupled to a bootstrap voltage terminal, and the first negative supply input is coupled to the switching terminal.

A second driver circuit has a second driver input, a second driver output, a second positive supply input and a second negative supply input. The second driver output is coupled to the second control terminal. The second positive supply input is coupled to a driver supply terminal, and the first negative supply input is coupled to the ground terminal. An active clamp circuit is coupled between the driver supply terminal and the ground terminal. The active clamp circuit prevents a voltage between the driver supply terminal and the ground terminal from exceeding a threshold voltage.

In a second example, a voltage clamp circuit includes a first transistor coupled between a driver supply terminal and a ground terminal, and has a first control terminal. A second transistor is coupled between the driver supply terminal and the first control terminal, and has a second control terminal. A first resistor is coupled between the driver supply terminal and the second control terminal. A capacitor is coupled between the second control terminal and the ground terminal.

A second resistor is coupled between the first control terminal and the ground terminal. A driver circuit has a positive voltage supply terminal and a negative voltage supply terminal. The positive voltage supply terminal is coupled to the driver supply terminal, and the negative voltage supply terminal is coupled to the ground terminal.

In a third example, a gate drive circuit includes an active clamp circuit coupled between a voltage driver terminal and a ground terminal. The active clamp circuit prevents a voltage between the voltage driver terminal and the ground terminal from exceeding a threshold voltage. A first driver circuit has a first driver input, a first driver output, a first positive supply input, and a first negative supply input. The first positive supply input is coupled to a bootstrap voltage terminal, and the first negative supply input is coupled to a switching terminal.

A second driver circuit has a second driver input, a second driver output, a second positive supply input and a second negative supply input. The second positive supply input is coupled to the voltage driver terminal, and the first negative supply input is coupled to the ground terminal. A first transistor is coupled between an input voltage terminal and the switching terminal, and has a first control terminal coupled to the first driver output. A second transistor is coupled between the switching terminal and the ground terminal, and has a second control terminal coupled to the second driver output.

DETAILED DESCRIPTION

In this description, the same reference numbers depict same or similar (by function and/or structure) features. The drawings are not necessarily drawn to scale.

Single phase and multiphase DC-DC power converters such as the power converters used in large computing and server systems typically require power stages with relatively high current-handling capability. As power requirements for these systems increase, power efficiency becomes an increasingly important specification. Reducing switching losses in power transistors can improve the power efficiency of a drive circuit in a power stage.

Power stages for multiphase DC-DC power converters are typically designed to have fast transistor turn-on and turn-off times to reduce the switching losses. However, faster transistor switching times can result in a higher magnitude of voltage ringing on the supply and ground lines due to parasitic inductances. Parasitic inductances on the supply and ground lines may combine with the capacitance of filter capacitors in the circuit to form an L-C tank circuit that produces ringing on the supply voltage and power ground lines.

Figure 1:
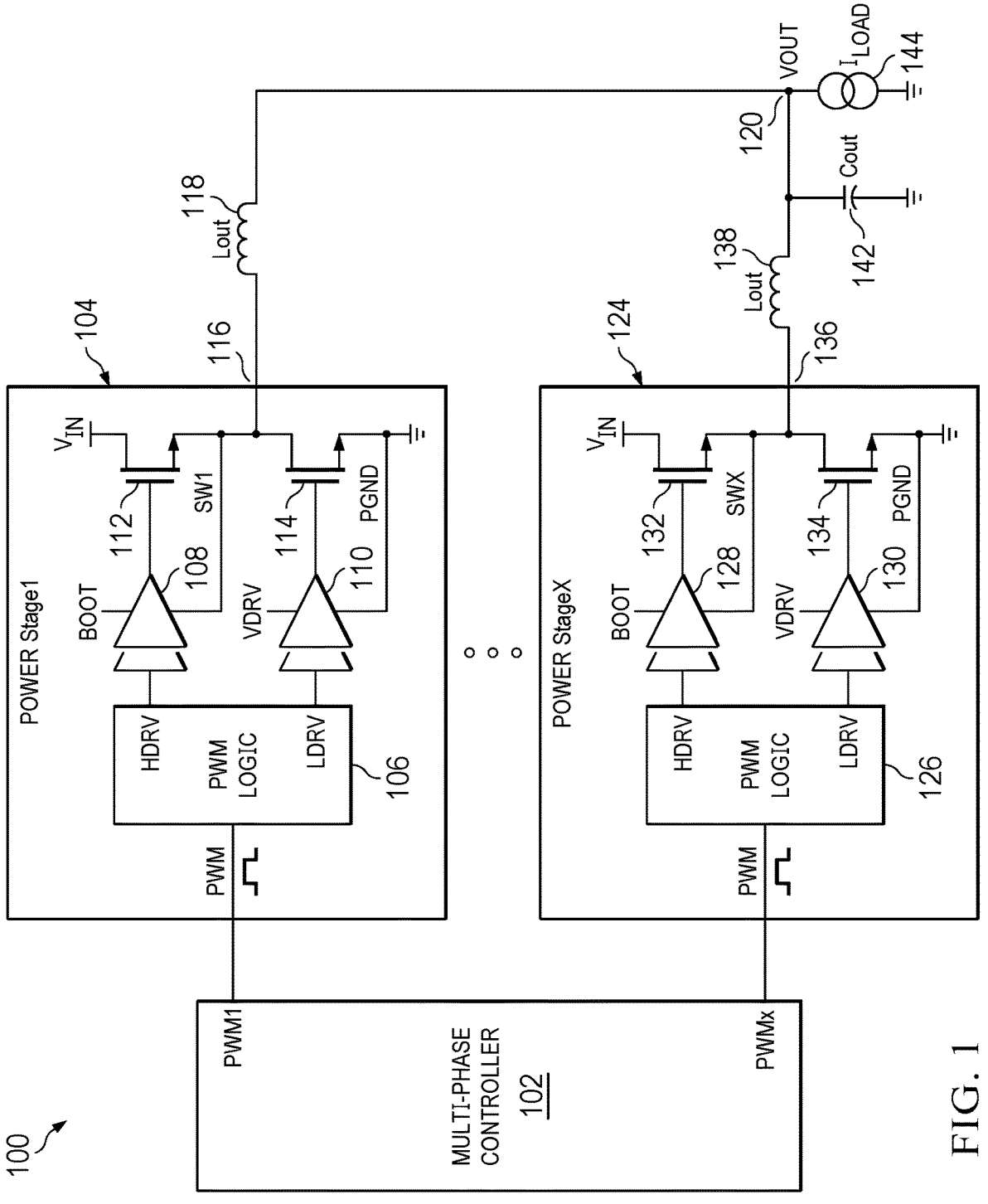
FIG. 1 shows a block diagram for an example multiphase DC-DC power converter.

FIG. 1 shows a block diagram for an example multiphase DC-DC power converter 100. Multiphase DC-DC power converter 100 has X number of phases, where X is an integer greater than or equal to two. Each of the X phases has a corresponding power stage. Power stage 1 104 is the power stage corresponding to phase one. Power stage 124 is the power stage corresponding to phase X.

Multiphase controller 102 has X number of outputs, PWM1 through PWMX. Each of the respective X outputs provides a pulse width modulated (PWM) control signal for controlling a respective power stage of a corresponding phase. PWM1 is the output control signal for the power stage corresponding to phase 1, and PWMX is the output control signal for the power stage corresponding to phase X. Power stage 1 104 includes PWM logic circuit 106, drivers 108 and 110, and transistors 112 and 114. Power stage X 124 includes PWM logic circuit 126, drivers 128 and 130, and transistors 132 and 134.

Each power stage provides an output current to a first terminal of a corresponding inductor. A second terminal of each inductor is coupled to an output voltage terminal VOUT 120. The voltage signal at output voltage terminal VOUT 120 is filtered by a decoupling capacitor $C_{out}$ 142 that is coupled between output voltage terminal VOUT 120 and a power ground terminal PGND. A load current $I_{LOAD}$ 144 is provided at the output voltage terminal VOUT 120 and is the sum of the currents provided by each respective power stage.

For phase 1, multiphase controller 102 has an output terminal PWM1 that provides a PWM signal to power stage 1 104. The PWM signal from PWM1 is provided to an input terminal of PWM logic circuit 106. PWM logic circuit 106 decodes the PWM signal from PWM1 and provides two outputs, HDRV and LDRV. The circuitry in PWM logic circuit 106 ensures that the high side transistor 112 and the low side transistor 114 are never turned on at the same time.

The first output of PWM logic circuit 106, HDRV, is coupled to the input of driver 108. A positive supply terminal of driver 108 is coupled to BOOT, which is the output of a voltage boost circuit that provides a supply voltage that is higher than the input voltage, $V_{IN}$. One example of a boost voltage circuit is a charge pump circuit. The negative supply terminal of driver 108 is coupled to a switching terminal SW1.

The second output of PWM logic circuit 106, LDRV, is coupled to the input of driver 110. The output of driver 108 is coupled to the gate of high side transistor 112. The output of driver 110 is coupled to the gate of low side transistor 114. A positive supply terminal of driver 110 is coupled to VDRV, which is a power supply terminal. The power source for VDRV can be the same as the power source for $V_{IN}$, or they may be independent of each other. A negative supply terminal for driver 110 is coupled to the power ground terminal PGND.

High side transistor 112 is coupled between the input voltage terminal $V_{IN}$ and the switching terminal SW1. Low side transistor 114 is coupled between the switching terminal SW1 and the power ground terminal PGND. The output 116 of power stage 1 is coupled to the switching terminal SW1, and is coupled to the output voltage terminal VOUT 120 through inductor 118.

For phase X, multiphase controller 102 has an output terminal PWMX that provides a PWM signal to power stage X 124. The PWM signal from PWMX is provided to an input terminal of PWM logic circuit 126. PWM logic circuit 126 decodes the PWM signal from PWMX and provides two outputs, HDRV and LDRV. The circuitry in PWM logic circuit 126 ensures that the high side transistor 132 and the low side transistor 134 are never turned on at the same time.

The first output of PWM logic circuit 126, HDRV, is coupled to the input of driver 128. A positive supply terminal of driver 128 is coupled to BOOT, the output of a voltage boost circuit that provides a supply voltage that is higher than the input voltage, $V_{IN}$. The negative supply terminal of driver 128 is coupled to a switching terminal SWX.

The second output of PWM logic circuit 126, LDRV, is coupled to the input of driver 130. The output of driver 128 is coupled to the gate of high side transistor 132. The output of driver 130 is coupled to the gate of low side transistor 134. A positive supply terminal of driver 130 is coupled to power supply terminal VDRV. The power source for VDRV can be the same as the power source for $V_{IN}$, or they may be independent of each other. A negative supply terminal for driver 130 is coupled to the power ground terminal PGND.

High side transistor 132 is coupled between the input voltage terminal $V_{IN}$ and the switching terminal SWX. Low side transistor 134 is coupled between the switching terminal SWX and the power ground terminal PGND. The output 136 of power stage X is coupled to the switching terminal SWX, and is coupled to the output voltage terminal VOUT 120 through inductor 138.

If a high current is drawn at the output of a power stage (e.g. 116) in a multiphase DC-DC power converter, a high voltage bounce due to ringing may occur on the power ground line PGND. Any voltage bounce that is present on PGND can get reflected onto the VDRV power supply line. Further exacerbating the problem, the voltage bounces occurring on PGND and the reflected voltage bounces on VDRV may not track each other. So, instead of cancelling each other out, the voltage bounces occurring on PGND and the reflected voltage bounces on VDRV may be additive. The power converter may be switching relatively fast to minimize switching losses, so the low side driver (e.g. 110) may experience a large ringing voltage, potentially over-stressing the low side driver and the gate of the transistor (e.g. 114).

A similar problem can occur with the high side driver from a transient on the bootstrap supply voltage BOOT being reflected to the voltage at the switching terminal SWx. The bootstrap supply voltage BOOT can be boosted using a bootstrap capacitor that charges during the low side transistor on-time. A high current through the low side transistor combined with fast switching times can lead to a voltage bounce or ringing on the bootstrap supply voltage BOOT, which can then be reflected on the switching terminal SWx.

Figure 2:
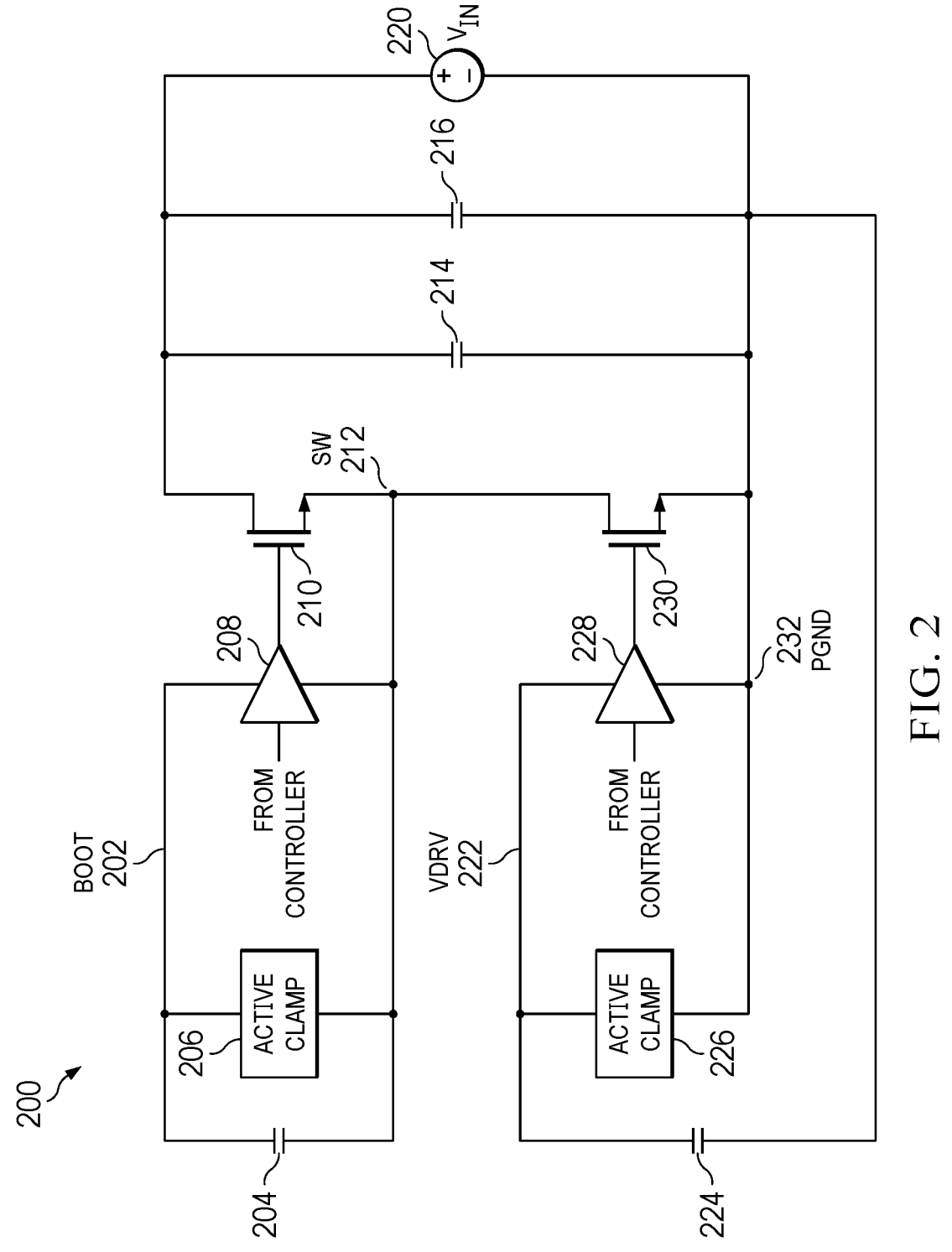
FIG. 2 shows a schematic diagram for an example power stage having active clamp circuits.

FIG. 2 shows a schematic diagram for an example power stage 200 having active clamp circuits 206 and 226. Power stage 200 includes high side drive transistor 210 and low side drive transistor 230. High side drive transistor 210 is coupled between an input voltage terminal $V_{IN}$ 220 and a switching terminal SW 212. Low side drive transistor 230 is coupled between the switching terminal SW 212 and a power ground terminal PGND 232.

High side gate driver 208 has a positive supply terminal coupled to a bootstrap supply voltage terminal BOOT 202, and has a negative supply terminal coupled to the switching terminal SW 212. High side gate driver 208 has an input coupled to a first output of a controller circuit (not shown) that provides a signal controlling the turning on and turning off of high side drive transistor 210. Low side gate driver 228 has a positive supply terminal coupled to a power supply terminal VDRV 222, and has a negative supply terminal coupled to the power ground terminal PGND 232. The power source supplying the power supply terminal VDRV 222 can be the same as the power source supplying the input voltage terminal $V_{IN}$ 220, or they may be independent of each other. Low side gate driver 228 has an input coupled to a second output of the controller circuit (not shown) that provides a signal controlling the turning on and turning off of low side drive transistor 230.

Capacitor 214 is coupled between the input voltage terminal $V_{IN}$ 220 and the power ground terminal PGND 232. Capacitor 216 is coupled between the input voltage terminal $V_{IN}$ 220 and the power ground terminal PGND 232. Capacitor 224 is coupled between the power supply terminal VDRV 222 and the power ground terminal PGND 232.

Capacitor 204 is coupled between the bootstrap supply voltage terminal BOOT 202 and the switching terminal SW 212.

Active clamp circuit 206 is coupled between the bootstrap supply voltage terminal BOOT 202 and the switching terminal SW 212 to protect high side gate driver 208 and capacitor 204 from overstress due to voltage spikes from ringing. Active clamp circuit 226 is coupled between the power supply terminal VDRV 222 and the power ground terminal PGND 232 to protect low side gate driver 228 and capacitor 224 from overstress due to voltage spikes from ringing.

Figure 3:
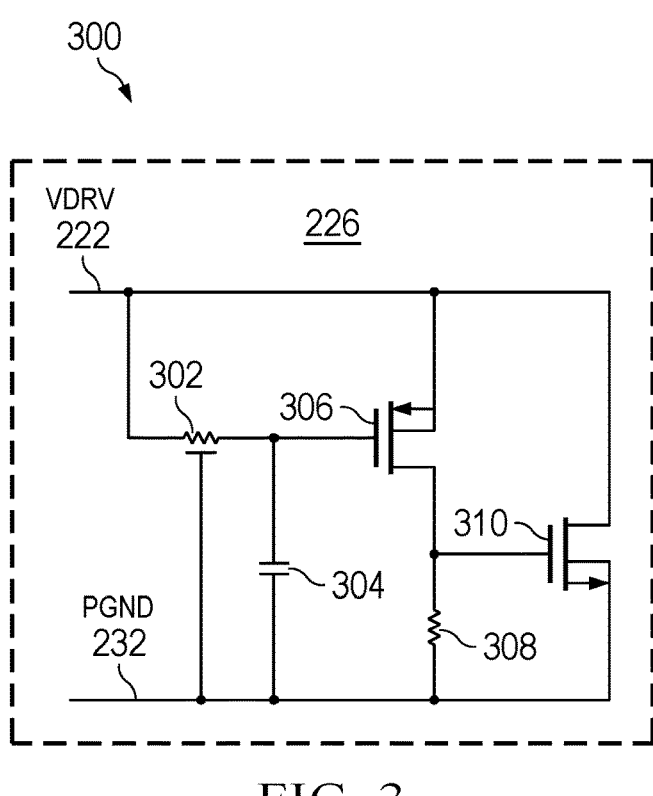
FIG. 3 shows a schematic diagram for an example active clamp circuit for use in a low side driver circuit.

FIG. 3 shows a schematic diagram for an example active clamp circuit for use in a low side driver circuit, such as active clamp circuit 226. Active clamp circuit 226 is coupled between the power supply terminal VDRV 222 and the power ground terminal PGND 232. Active clamp circuit 226 includes transistors 306 and 310, resistors 302 and 308, and capacitor 304. In at least one case, transistor 306 is a p-channel field effect transistor (PFET), and transistor 310 is an n-channel field effect transistor (NFET). However, as an alternative, it is possible for transistor 306 to be an NFET and transistor 310 to be a PFET in active clamp circuit 226.

Resistor 302 is coupled between the power supply terminal VDRV 222 and the gate of transistor 306. Capacitor 304 is coupled between the gate of transistor 306 and the power ground terminal PGND 232. Transistor 306 is coupled between the power supply terminal VDRV 222 and the gate of transistor 310. Resistor 308 is coupled between the gate of transistor 310 and the power ground terminal PGND 232.

Active clamp circuit 226 is designed and sized specifically for high voltage transient voltages between the power supply terminal VDRV 222 and the power ground terminal PGND 232. Resistor 302 and capacitor 304 form an R-C filter that is sized to turn active clamp circuit 226 on for a specific overshoot voltage between the power supply terminal VDRV 222 and the power ground terminal PGND 232. In at least one case, one or both of resistor 302 and capacitor 304 have a variable resistance or variable capacitance, respectively.

If a transient occurs on the power supply line, the voltage at the power supply terminal VDRV 222 may increase. As the voltage on VDRV increases, capacitor 304 prevents the voltage at the gate of transistor 306 from increasing instantly. The rate of voltage increase at the power supply terminal VDRV 222 is very high, but the rate of increase of the voltage at the gate of transistor 306 is significantly slower due to the R-C. The rate of increase of the voltage at the gate of transistor 306 is determined by the R-C time constant set by resistor 302 and capacitor 304. The resistance value of resistor 302 and the capacitance value of capacitor 304 determine the voltage at which active clamp circuit 226 triggers to activate protection for low side gate driver 228.

The quick voltage rise at the power supply terminal VDRV 222 together with the significantly slower voltage rise at the gate of transistor 306 creates a voltage difference between the source of transistor 306 and the gate of transistor 306. If the gate-to-source voltage ($V_{GS}$) of transistor 306 becomes higher than its threshold voltage, transistor 306 turns on. If the voltage difference between the gate and source of transistor 306 does not become large enough to exceed the threshold voltage, transistor 306 never turns on, and active clamp circuit 226 remains turned off.

Transistor 306 turning on causes current to flow to the gate of transistor 310 through transistor 306, turning transistor 310 on. When transistor 310 turns on, transistor 310 clamps the voltage between power supply terminal VDRV 222 and the power ground terminal PGND 232 at a particular voltage. Transistor 310 sinks current and absorbs energy from the ringing when it is turned on. As transistor 310 absorbs the energy from the ringing, the ringing dies down, allowing the voltage level at the power supply terminal VDRV 222 to return to its nominal level. The $V_{GS}$ of transistor 306 then falls below the threshold voltage, causing transistor 306 to turn off. Transistor 306 turning off causes transistor 310 to turn off, and active clamp circuit 226 turns off.

Figure 4:
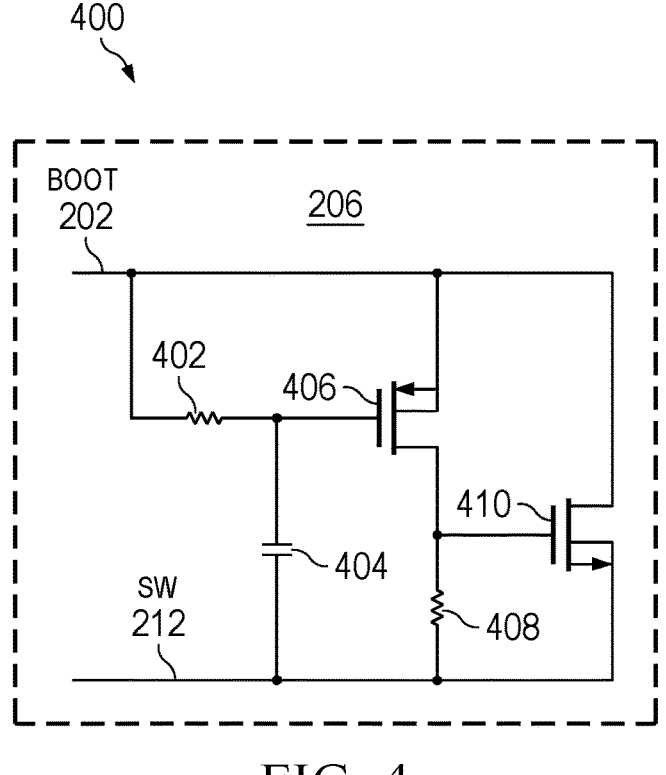
FIG. 4 shows a schematic diagram for an example active clamp circuit for use in a high side driver circuit.

FIG. 4 shows a schematic diagram for an example active clamp circuit for use in a high side driver circuit, such as active clamp circuit 206. Active clamp circuit 206 is coupled between the bootstrap supply voltage terminal BOOT 202 and the switching terminal SW 212. Active clamp circuit 206 includes transistors 406 and 410, resistors 402 and 408, and capacitor 404. In at least one case, transistor 406 is a PFET, and transistor 410 is an NFET. However, as an alternative, it is possible for transistor 406 to be an NFET and transistor 410 to be a PFET in active clamp circuit 206.

Resistor 402 is coupled between the bootstrap supply voltage terminal BOOT 202 and the gate of transistor 406. Capacitor 404 is coupled between the gate of transistor 406 and the switching terminal SW 212. Transistor 406 is coupled between the bootstrap supply voltage terminal BOOT 202 and the gate of transistor 410. Resistor 408 is coupled between the gate of transistor 410 and switching terminal SW 212.

Active clamp circuit 206 is designed and sized specifically for high voltage transient voltages between the bootstrap supply voltage terminal BOOT 202 and the switching terminal SW 212. Resistor 402 and capacitor 404 form an R-C filter that is sized to turn active clamp circuit 206 on for a specific overshoot voltage between the bootstrap supply voltage terminal BOOT 202 and the switching terminal SW 212. In at least one case, one or both of resistor 402 and capacitor 404 have a variable resistance or variable capacitance, respectively.

If a transient occurs on the power supply line, the voltage at the bootstrap supply voltage terminal BOOT 202 may increase. As the voltage at the bootstrap supply voltage terminal BOOT 202 increases, capacitor 404 prevents the voltage at the gate of transistor 406 from increasing instantly. The rate of increase in voltage at the bootstrap supply voltage terminal BOOT 202 is very high, but the rate of voltage increase at the gate of transistor 406 is significantly slower due to the R-C. The rate of increase in voltage at the gate of transistor 406 is determined by the R-C time constant set by resistor 402 and capacitor 404.

The quick voltage increase at the bootstrap supply voltage terminal BOOT 202 combined with the significantly slower voltage increase at the gate of transistor 406 creates a voltage difference between the source of transistor 406 and the gate of transistor 406. If the $V_{GS}$ of transistor 406 becomes higher than its threshold voltage, transistor 406 turns on. If the voltage difference between the gate and source of transistor 406 does not become large enough to exceed the threshold voltage, transistor 406 never turns on, and active clamp circuit 206 remains turned off.

Transistor 406 turning on causes current to flow to the gate of transistor 410 through transistor 406, turning transistor 410 on. When transistor 410 turns on, transistor 410 clamps the voltage between the bootstrap supply voltage terminal BOOT 202 and the switching terminal SW 212 at a particular voltage. Transistor 410 sinks current and absorbs energy from the ringing when it is turned on. As transistor 410 absorbs the energy from the ringing, the ringing dies down, allowing the voltage level at the bootstrap supply voltage terminal BOOT 202 to return to its nominal operating range. The $V_{GS}$ of transistor 406 then falls below its threshold voltage, causing transistor 406 to turn off. Transistor 406 turning off causes transistor 410 to turn off, and active clamp circuit 206 turns off.

Figure 5:
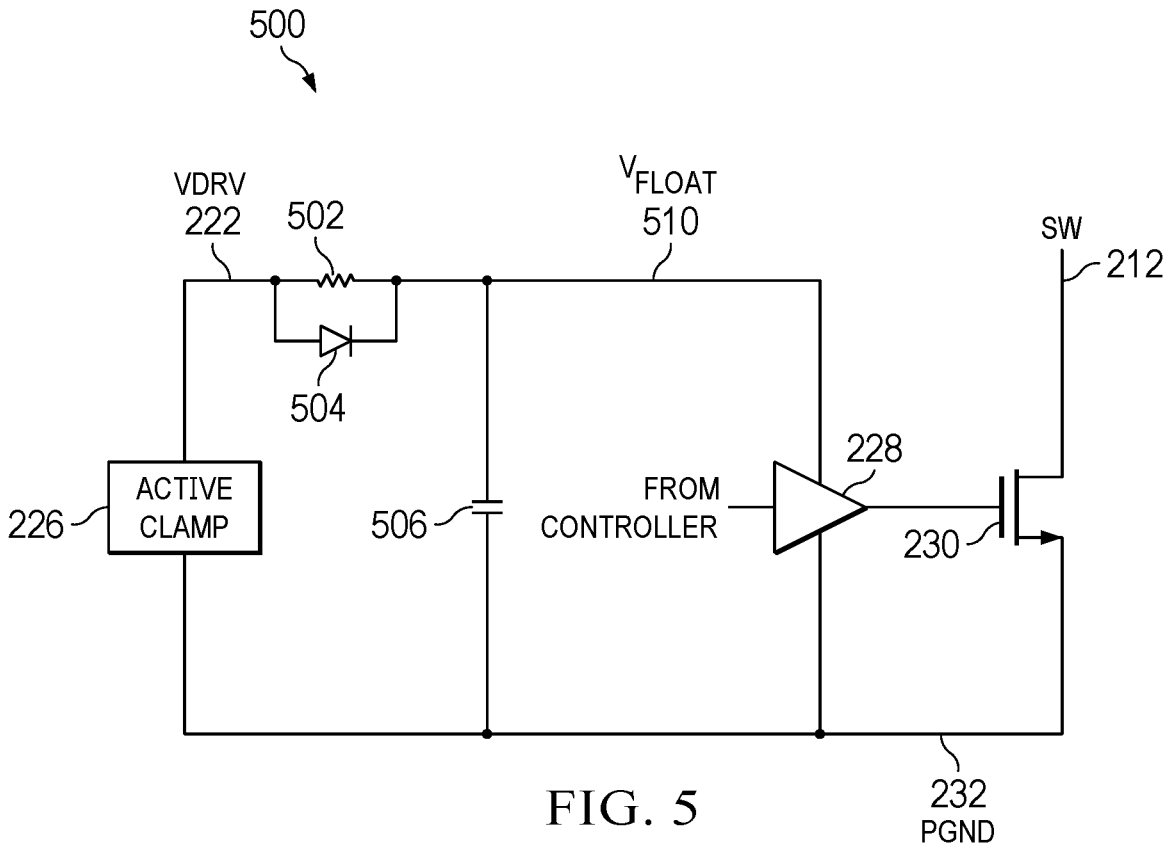
FIG. 5 shows a schematic diagram for an example gate driver circuit having a floating voltage supply input.

Further protection from voltage ringing due to transients can be achieved by coupling the positive supply terminal of the gate driver to a floating supply voltage source. FIG. 5 shows a schematic diagram for an example gate driver circuit 500 having a floating voltage supply input. The voltage supply is called a floating supply because the positive supply terminal of the gate driver is not being driven with a steady voltage source, but is instead driven by a voltage across a capacitor that can vary within a voltage range.

Gate driver circuit 500 includes low side gate driver 228. The positive supply terminal of low side gate driver 228 is coupled to floating voltage supply $V_{FLOAT}$ 510, which provides a floating voltage supply that is derived from power supply terminal VDRV 222. Floating voltage supply $V_{FLOAT}$ 510 can be considered an improved version of the supply voltage at the power supply terminal VDRV 222 with overshoot protection to protect low side gate driver 228. The negative supply terminal of low side gate driver 228 is coupled to the power ground terminal PGND 232. Active clamp circuit 226 is coupled between the power supply terminal VDRV 222 and the power ground terminal PGND 232.

Resistor 502 is coupled between the power supply terminal VDRV 222 and floating voltage supply $V_{FLOAT}$ 510. Diode 504 is coupled in parallel with resistor 502 with its anode coupled to power supply terminal VDRV 222, and its cathode coupled to floating voltage supply $V_{FLOAT}$ 510. Capacitor 506 is coupled between floating voltage supply $V_{FLOAT}$ 510 and the power ground terminal PGND 232. In at least one case, the input of low side gate driver 228 is coupled to a controller (e.g. 102) and receive a PWM signal from the controller for controlling a low side drive transistor 230. The output of low side gate driver 228 is coupled to the gate of low side drive transistor 230.

There is a voltage clamping between the power supply terminal VDRV 222 and the power ground terminal PGND 232 due to active clamp circuit 226. If ringing occurs, the ringing voltage will go both positive and negative. It is important to ensure that the voltage provided to the positive supply terminal of low side gate driver 228 remains high enough that low side drive transistor 230 is well-controlled. Diode 504 allows voltage to pass when the ringing goes high because the diode will be forward-biased. So, the voltage at the cathode of diode 504 will follow the voltage at the power supply terminal VDRV 222. Because resistor 502 is connected in parallel with diode 504, the voltage at the floating voltage supply $V_{FLOAT}$ 510 will not remain at the peak voltage. The voltage will slowly decrease as the resistor bleeds the voltage off, ensuring that low side drive transistor 230 is not continually overstressed in case the voltage at the power supply terminal VDRV 222 becomes too high due to ringing.

If the ringing voltage goes negative, diode 504 will be reverse-biased and turn off. With diode 504 turned off, the voltage on the floating voltage supply $V_{FLOAT}$ 510 that will be provided to the positive supply terminal of low side gate driver 228 is the voltage across capacitor 506. So, it will be a capacitor supplying the gate driver instead of a steady DC power source, and thus it is referred to as a floating supply.

The floating voltage supply $V_{FLOAT}$ 510 helps to protect gate driver circuit 500 by maintaining a good supply voltage to low side gate driver 228 even in a noisy voltage environment. Maintaining a good supply voltage to low side gate driver 228 helps to maintain good control on low side drive transistor 230. Without maintaining good control on low side drive transistor 230, the transistor could turn on during the high side on-time, potentially causing a catastrophic circuit failure.

Figure 6:
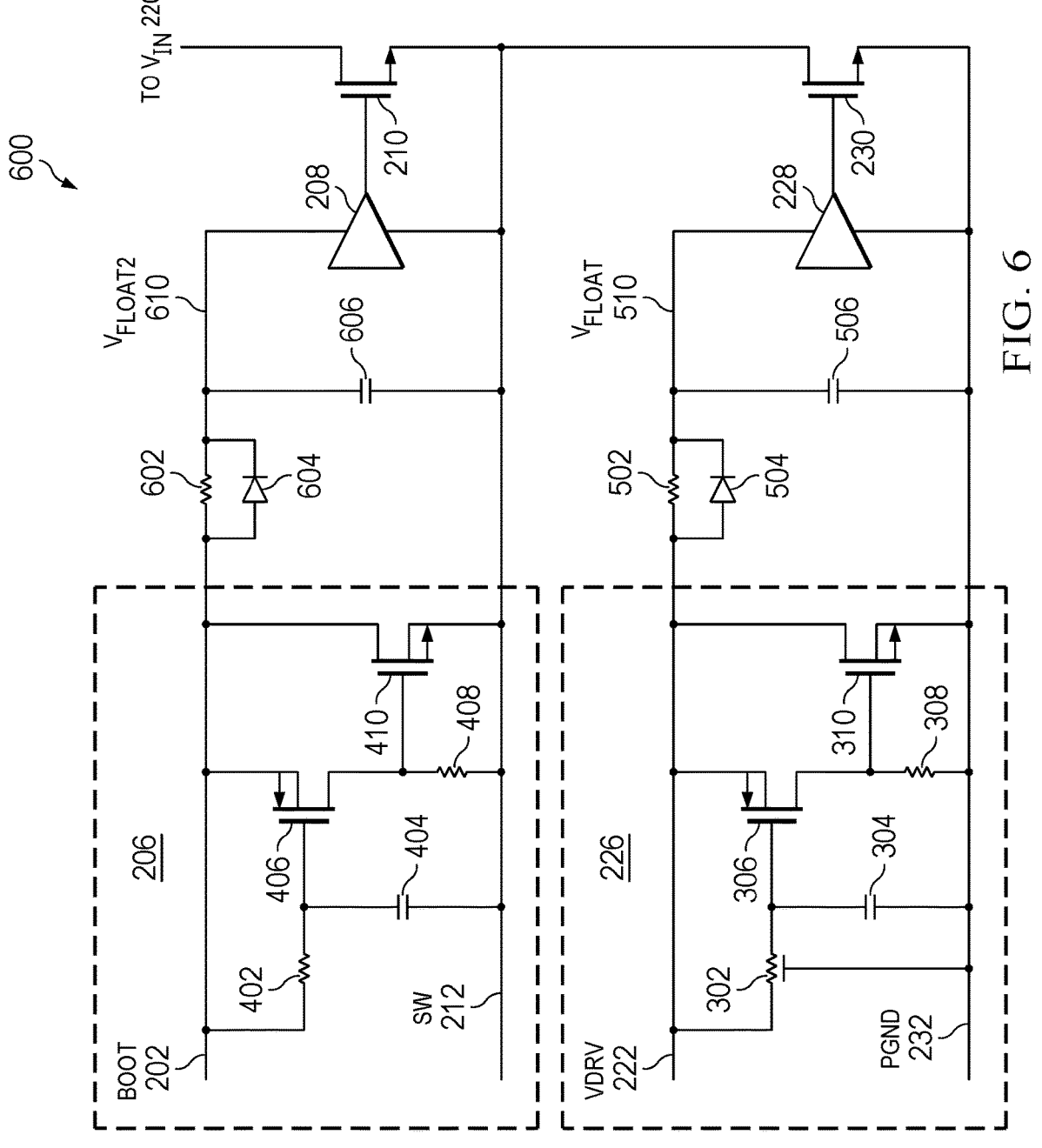
FIG. 6 shows a schematic diagram for an example high side and low side gate driver circuit having a floating voltage supply input and active clamp circuits.

FIG. 6 shows a schematic diagram for an example high side and low side gate driver circuit 600 having a floating voltage supply input and active clamp circuits. High side and low side gate driver circuit 600 may be part of a single phase power converter, or may be part of a multiphase power converter. High side and low side gate driver circuit 600 includes active clamp circuits 206 and 226, high side gate driver 208, low side gate driver 228, high side drive transistor 210, low side drive transistor 230, and first and second floating voltage supply circuits to supply the low side gate driver and high side gate driver, respectively.

Active clamp circuit 206 is coupled between the bootstrap supply voltage terminal BOOT 202 and the switching terminal SW 212. Active clamp circuit 206 includes transistors 406 and 410, resistors 402 and 408, and capacitor 404. Resistor 402 is coupled between the bootstrap supply voltage terminal BOOT 202 and the gate of transistor 406. Capacitor 404 is coupled between the gate of transistor 406 and the switching terminal SW 212. Transistor 406 is coupled between the bootstrap supply voltage terminal BOOT 202 and the gate of transistor 410. Resistor 408 is coupled between the gate of transistor 410 and switching terminal SW 212.

Active clamp circuit 226 is coupled between the power supply terminal VDRV 222 and the power ground terminal PGND 232. Active clamp circuit 226 includes transistors 306 and 310, resistors 302 and 308, and capacitor 304. Resistor 302 is coupled between the power supply terminal VDRV 222 and the gate of transistor 306. Capacitor 304 is coupled between the gate of transistor 306 and the power ground terminal PGND 232. Transistor 306 is coupled between the power supply terminal VDRV 222 and the gate of transistor 310. Resistor 308 is coupled between the gate of transistor 310 and the power ground terminal PGND 232.

The first floating voltage supply circuit is coupled between the power supply terminal VDRV 222 and floating voltage supply $V_{FLOAT}$ 510. The first floating voltage supply $V_{FLOAT}$ 510 is coupled to the positive supply terminal of low side gate driver 228. The first floating voltage supply circuit includes resistor 502, diode 504, and capacitor 506. Resistor 502 is coupled between power supply terminal VDRV 222 and floating voltage supply $V_{FLOAT}$ 510. Diode 504 is coupled in parallel with resistor 502 with its anode coupled to the power supply terminal VDRV 222, and its cathode coupled to floating voltage supply $V_{FLOAT}$ 510. Capacitor 506 is coupled between floating voltage supply $V_{FLOAT}$ 510 and the power ground terminal PGND 232.

The second floating voltage supply circuit is coupled between the bootstrap supply voltage terminal BOOT 202 and floating voltage supply $V_{FLOAT2}$ 610. The second floating voltage supply $V_{FLOAT2}$ 610 is coupled to the positive supply terminal of high side gate driver 208. The second floating voltage supply circuit includes resistor 602, diode 604, and capacitor 606. Resistor 602 is coupled between the bootstrap supply voltage terminal BOOT 202 and floating voltage supply $V_{FLOAT2}$ 610. Diode 604 is coupled in parallel with resistor 602 with its anode coupled to the bootstrap supply voltage terminal BOOT 202, and its cathode coupled to floating voltage supply $V_{FLOAT2}$ 610. Capacitor 606 is coupled between floating voltage supply $V_{FLOAT2}$ 610 and the switching terminal SW 212.

Gate driver 208 has an input (not shown) coupled to a first output of a controller (not shown). The output of high side gate driver 208 is coupled to the gate of high side drive transistor 210. High side drive transistor 210 is coupled between the input voltage terminal $V_{IN}$ 220 and the switching terminal SW 212. Gate driver 228 has an input (not shown) coupled to a second output of the controller (not shown). The output of low side gate driver 228 is coupled to the gate of low side drive transistor 230. Low side drive transistor 230 is coupled between the switching terminal SW 212 and the power ground terminal PGND 232.

The floating voltage supply input for the gate drivers and the active clamp circuits of high side and low side gate driver circuit 600 may provide improved power efficiency compared to previous solutions. High side and low side gate driver circuit 600 may also allow use of smaller and less costly drive transistors while still meeting high current specifications. The active clamp circuits of high side and low side gate driver circuit 600 can also help to prevent overstress voltage conditions on components from transients, such as with ringing from parasitic inductances, thus potentially improving reliability.

In this description, "terminal," "node," "interconnection," "lead" and "pin" are used interchangeably. Unless specifically stated to the contrary, these terms generally mean an interconnection between or a terminus of a device element, a circuit element, an integrated circuit, a device, or other electronics or semiconductor component.

In this description, "ground" includes a chassis ground, an Earth ground, a floating ground, a virtual ground, a digital ground, a common ground and/or any other form of ground connection applicable to, or suitable for, the teachings of this description.

In this description, the term "couple" may cover connections, communications or signal paths that enable a functional relationship consistent with this description. For example, if device A generates a signal to control device B to perform an action, then: (a) in a first example, device A is coupled to device B by direct connection; or (b) in a second example, device A is coupled to device B through intervening component C if intervening component C does not alter the functional relationship between device A and device B, so device B is controlled by device A via the control signal generated by device A.

In this description, even if operations are described in a particular order, some operations may be optional, and the operations are not necessarily required to be performed in that particular order to achieve specified results. In some examples, multitasking and parallel processing may be advantageous. Moreover, a separation of various system components in the embodiments described above does not necessarily require such separation in all embodiments.

Modifications are possible in the described embodiments, and other embodiments are possible, within the scope of the claims.

What is claimed is:

1. A circuit comprising:
   a first transistor having first and second terminals and a control terminal, the first terminal coupled to an input voltage terminal, the second terminal coupled to a switching terminal;
   a second transistor having a first terminal coupled to the switching terminal, a second terminal coupled to a ground terminal, and a control terminal;

a first driver circuit having an output coupled to the control terminal of the first transistor;
   a second driver circuit having first and second supply terminals and an output, the output coupled to the control terminal of the second transistor, the second supply terminal coupled to the ground terminal; and
   a clamp circuit including:
      a third transistor having a first terminal coupled to the first supply terminal of the second driver circuit, a second terminal coupled to the second supply terminal, and a control terminal; and
      a control circuit coupled to the control terminal of the third transistor, the control circuit including a fourth transistor having a first terminal coupled to the first supply terminal of the second driver circuit and a second terminal coupled to the control terminal of the third transistor.

2. The circuit of claim 1, wherein the control circuit includes a filter circuit coupled to a control terminal of the fourth transistor.

3. The circuit of claim 2, wherein the filter circuit includes:
   a resistor having a first terminal coupled to the first supply terminal and a second terminal coupled to the control terminal of the fourth transistor; and
   a capacitor having a first terminal coupled to the control terminal of the fourth transistor and a second terminal coupled to the second supply terminal.

4. The circuit of claim 3, wherein the clamp circuit is a first clamp circuit, the resistor is a first resistor, and the capacitor is a first capacitor, and further comprising a second clamp circuit including:
   a fifth transistor having a first terminal coupled to a first supply terminal of the first driver circuit, a second terminal coupled to the second supply terminal of the first driver circuit and to the switching terminal, and a control terminal;
   a sixth transistor having a first terminal coupled to the first supply terminal of the first driver circuit, a second terminal coupled to the control terminal of the fifth transistor, and a control terminal;
   a second resistor having a first terminal coupled to the first supply terminal of the first driver circuit, and a second terminal coupled to the control terminal of the sixth transistor; and
   a second capacitor having a first terminal coupled to the control terminal of the sixth transistor and a second terminal coupled to the second supply terminal of the first driver circuit.

5. The circuit of claim 3, wherein the capacitor is a first capacitor, and further comprising a second capacitor having a first terminal coupled to the first supply terminal and a second terminal coupled to the second supply terminal.

6. The circuit of claim 5, wherein the resistor is a first resistor, and further comprising:
   a second resistor having a first terminal coupled to the first terminals of the first resistor and the third and fourth transistors, and a second terminal coupled to the first supply terminal; and
   a diode coupled in parallel with the second resistor.

7. The circuit of claim 6, further comprising third resistor having a first terminal coupled to the control terminal of the third transistor and a second terminal coupled to the second supply terminal.

8. The circuit of claim 3, wherein the resistor is an adjustable resistor having a control terminal coupled to the second supply terminal.

9. A circuit comprising:

a driver circuit having first and second supply terminals;

a first transistor having a first terminal coupled to the first supply terminal, a second terminal coupled to the second supply terminal, and a control terminal;

a second transistor having a first terminal coupled to the first supply terminal, a second terminal coupled to the control terminal of the first transistor, and a control terminal;

a first resistor having a first terminal coupled to the first supply terminal and a second terminal coupled to the control terminal of the second transistor;

a capacitor having a first terminal coupled to the control terminal of the second transistor and a second terminal coupled to the second supply terminal;

a second resistor having a first terminal coupled to the control terminal of the first transistor and a second terminal coupled to the second supply terminal.

10. The circuit of claim 9, wherein the capacitor is a first capacitor, and further comprising a second capacitor having a first terminal coupled to the first supply terminal and a second terminal coupled to the second supply terminal.

11. The circuit of claim 10, further comprising:

a third resistor having a first terminal coupled to the first terminals of the first resistor and the first and second transistors, and a second terminal coupled to the first supply terminal; and a diode coupled in parallel with the third resistor.

12. The circuit of claim 9, wherein the second supply terminal is coupled to a ground terminal of an output stage for a power converter.

13. The circuit of claim 9, wherein the second supply terminal is coupled to a switching terminal of an output stage for a power converter.

14. The circuit of claim 9, wherein the first resistor is an adjustable resistor having a control terminal coupled to the second supply terminal.

15. The circuit of claim 9, wherein the first transistor is an n-channel field effect transistor (NFET), and the second transistor is a p-channel field effect transistor (PFET).

16. A circuit comprising:

a first driver circuit having an output;

a second driver circuit having first and second supply terminals and an output;

a first transistor having a first terminal coupled to an input voltage terminal, a second terminal coupled to a switching terminal, and a control terminal coupled to the output of the first driver circuit;

a second transistor having a first terminal coupled to the switching terminal, a second terminal coupled to a ground terminal, and a control terminal coupled to the output of the second driver circuit; and a clamp circuit including:

a third transistor having a first terminal coupled to the first supply terminal of the second driver circuit, a second terminal coupled to the second supply terminal, and a control terminal;

a current source coupled to the control terminal of the third transistor; and a resistor and capacitor circuit capable of controlling the current source.

17. The circuit of claim 16, wherein the clamp circuit is a first clamp circuit and further comprising a second clamp circuit coupled between a first supply terminal of the first driver circuit and a second supply terminal of the first driver circuit, in which the second supply terminal of the first driver circuit is coupled to the switching terminal.

18. The circuit of claim 17, wherein the second clamp circuit includes:

a fourth transistor having a first terminal coupled to the first supply terminal of the first driver circuit, a second terminal coupled to the second supply terminal of the first driver circuit, and a control terminal;

a fifth transistor having a first terminal coupled to the first supply terminal of the first driver circuit, a second terminal coupled to the control terminal of the fourth transistor, and a control terminal;

a first resistor having a first terminal coupled to the first supply terminal of the first driver circuit and a second terminal coupled to the control terminal of the fifth transistor;

a capacitor having a first terminal coupled to the control terminal of the fifth transistor and a second terminal coupled to the second supply terminal of the first driver circuit; and a second resistor having a first terminal coupled to the control terminal of the fourth transistor and a second terminal coupled to the second supply terminal of the first driver circuit.

19. The circuit of claim 16, wherein the current source includes a fourth transistor having a first terminal coupled to the first supply terminal and a second terminal coupled to the control terminal of the third transistor.

20. The circuit of claim 19, wherein the resistor and capacitor circuit includes:

a resistor having a first terminal coupled to the first supply terminal and a second terminal coupled to a control terminal of the fourth transistor; and a capacitor having a first terminal coupled to the control terminal of the fourth transistor and a second terminal coupled to the second supply terminal.

21. The circuit of claim 20, wherein the capacitor is a first capacitor, and further comprising a second capacitor having a first terminal coupled to the first supply terminal and a second terminal coupled to the second supply terminal.

22. The circuit of claim 21, wherein the resistor is a first resistor, and further comprising:

a second resistor having a first terminal coupled to the first terminals of the first resistor and the first and second transistors, and a second terminal coupled to the first supply terminal; and a diode coupled in parallel to the second resistor.

23. The circuit of claim 20, wherein the circuit is one of multiple output stages of a multiphase DC-DC power converter.

* * * * *